United States Patent
Can et al.

(10) Patent No.: US 7,867,438 B2
(45) Date of Patent: Jan. 11, 2011

(54) CUBIC BORON NITRIDE COMPACT

(76) Inventors: Nedret Can, 29 Lotus Road, Sunwardpark, 1459, Boksburg (ZA); Stig Ake Andersin, Enebacken 28, S-915 32, Robertsfors (SE); Robert Fries, 4 Birnam Road, Forest Town, 2193 (ZA); Iain Patrick Goudemond, 6 Haldane Crescent, Wendywood, 2144, Sandton (ZA)

( * ) Notice: Subject to any disclaimer, the term of this patent is extended or adjusted under 35 U.S.C. 154(b) by 707 days.

(21) Appl. No.: 11/718,281

(22) PCT Filed: Oct. 28, 2005

(86) PCT No.: PCT/IB2005/003218

§ 371 (c)(1), (2), (4) Date: Oct. 29, 2007

(87) PCT Pub. No.: WO2006/046124

PCT Pub. Date: May 4, 2006

(65) Prior Publication Data

US 2009/0080986 A1    Mar. 26, 2009

(30) Foreign Application Priority Data

Oct. 29, 2004  (IE) ............... S2004/0721
Oct. 29, 2004  (IE) ............... S2004/0722

(51) Int. Cl.
*C09K 3/14* (2006.01)
*C22C 29/16* (2006.01)
*B23B 27/14* (2006.01)

(52) U.S. Cl. ............... 419/10; 419/13; 419/32; 419/33; 51/307; 51/309

(58) Field of Classification Search ............ 419/13, 419/32, 33; 51/307, 309
See application file for complete search history.

(56) References Cited

U.S. PATENT DOCUMENTS

| | | | | | |
|---|---|---|---|---|---|
| 4,334,928 | A | * | 6/1982 | Hara et al. | 75/238 |
| 4,911,756 | A | * | 3/1990 | Nakai et al. | 75/238 |
| 5,092,920 | A | * | 3/1992 | Nakai et al. | 75/238 |
| 5,200,372 | A | * | 4/1993 | Kuroyama et al. | 501/96.4 |
| 6,316,094 | B1 | * | 11/2001 | Fukaya et al. | 428/323 |
| 6,814,775 | B2 | * | 11/2004 | Scurlock et al. | 75/244 |

FOREIGN PATENT DOCUMENTS

| EP | 0 974 566 | 1/2000 |
|---|---|---|
| EP | 1 043 410 | 10/2000 |

OTHER PUBLICATIONS

U.S. Appl. No. 11/718,119, filed Apr. 27, 2007, Can, et al.
U.S. Appl. No. 11/718,249, filed Apr. 30, 2007, Can, et al.

* cited by examiner

*Primary Examiner*—Roy King
*Assistant Examiner*—Ngoclan T Mai
(74) *Attorney, Agent, or Firm*—Oblon, Spivak, McClelland, Maier & Neustadt, L.L.P.

(57) ABSTRACT

A method of manufacturing a powdered composition or starting material used in producing a CBN compact which comprises CBN, a secondary hard phase and a binder phase includes two steps of attrition milling. First, the attrition milling of the secondary hard phase and the binder phase. Second, adding CBN particles to the fine particle mixture of the first attrition milling and then attrition milling this mixture.

16 Claims, No Drawings

CUBIC BORON NITRIDE COMPACT

BACKGROUND OF THE INVENTION

This invention relates to the manufacture of a powdered composition suitable for use in the manufacture of cubic boron nitride abrasive compacts, and specifically to compacts with enhanced wear resistance, and increased chip resistance.

Boron nitride exists typically in three crystalline forms, namely cubic boron nitride (CBN), hexagonal boron nitride (hBN) and wurtzitic cubic boron nitride (wBN). Cubic boron nitride is a hard zinc blende form of boron nitride that has a similar structure to that of diamond. In the CBN structure, the bonds that form between the atoms are strong, mainly covalent tetrahedral bonds. Methods for preparing CBN are well known in the art. One such method is subjecting hBN to very high pressures and temperatures, in the presence of a specific catalytic additive material, which may include the alkali metals, alkaline earth metals, lead, tin and nitrides of these metals. When the temperature and pressure are decreased, CBN may be recovered.

CBN has wide commercial application in machining tools and the like. It may be used as an abrasive particle in grinding wheels, cutting tools and the like or bonded to a tool body to form a tool insert using conventional electroplating techniques.

CBN may also be used in bonded form as a CBN compact. CBN compacts tend to have good abrasive wear, are thermally stable, have a high thermal conductivity, good impact resistance and have a low coefficient of friction when in contact with iron containing metals.

Diamond is the only known material that is harder than CBN. However, as diamond tends to react with certain materials such as iron, it cannot be used when working with iron containing metals and therefore use of CBN in these instances is preferable.

CBN compacts comprise sintered masses of CBN particles. When the CBN content exceeds 80 percent by volume of the compact, there is a considerable amount of CBN-to-CBN contact and bonding. When the CBN content is lower, e.g. in the region of 40 to 60 percent by volume of the compact, then the extent of direct CBN-to-CBN contact and bonding is less.

CBN compacts will generally also contain a binder phase for example aluminium, silicon, cobalt, nickel, and titanium.

When the CBN content of the compact is less than 70 percent by volume there is generally present another hard phase, a secondary phase, which may be ceramic in nature. Examples of suitable ceramic hard phases are carbides, nitrides, borides and carbonitrides of a Group 4, 5 or 6 (according to the new IUPAC format) transition metal, aluminium oxide, and carbides such as tungsten carbide and mixtures thereof. The matrix constitutes all the ingredients in the composition excluding CBN.

In U.S. Pat. No. 6,316,094, a variety of mixing techniques are employed to effect the mixing of the matrix materials and the CBN prior to sintering, for example ultrasonic mixing, ball milling and mixing using an attritor. Mixing using an attritor was claimed to result in a decreased tool life when compared to most other mixing methods.

CBN compacts may be bonded directly to a tool body in the formation of a tool insert or tool. However, for many applications it is preferable that the compact is bonded to a substrate/support material, forming a supported compact structure, and then the supported compact structure is bonded to a tool body. The substrate/support material is typically a cemented metal carbide that is bonded together with a binder such as cobalt, nickel, iron or a mixture or alloy thereof. The metal carbide particles may comprise tungsten, titanium or tantalum carbide particles or a mixture thereof.

A known method for manufacturing the CBN compacts and supported compact structures involves subjecting an unsintered mass of CBN particles, to high temperature and high pressure conditions, i.e. conditions at which the CBN is crystallographically stable, for a suitable time period. A binder phase may be used to enhance the bonding of the particles. Typical conditions of high temperature and pressure (HTHP) which are used are temperatures in the region of 1100° C. or higher and pressures of the order of 2 GPa or higher. The time period for maintaining these conditions is typically about 3 to 120 minutes.

The sintered CBN compact, with or without substrate, is often cut into the desired size and/or shape of the particular cutting or drilling tool to be used and then mounted on to a tool body utilising brazing techniques.

CBN compacts are employed widely in the manufacture of cutting tools for finish machining of hardened steels, such as case hardened steels, ball-bearing steels and through hardened engineering steels. In addition to the conditions of use, such as cutting speed, feed and depth of cut, the performance of the CBN tool is generally known to be dependent on the geometry of the workpiece and in particular, whether the tool is constantly engaged in the workpiece for prolonged periods of time, known in the field as "continuous cutting", or whether the tool engages the workpiece in an intermittent manner, generally known in the field as "interrupted cutting".

Depending on the workpiece geometry, it is common for the CBN tool to experience both continuous and interrupted cutting within a process cycle and furthermore, the ratio of continuous to interrupted cutting varies widely in the field. After extensive research in this field it was discovered that these different modes of cutting place very different demands on the CBN material comprising the cutting edge of the tool. The main problem is that the tools tend to fail catastrophically by fracturing or chipping, exacerbated by an increasing demand in the market for higher productivity through increased cutting speeds and hence have a reduced tool life.

SUMMARY OF THE INVENTION

According to the present invention, a method of making a powdered composition suitable for the manufacture of a CBN compact, such composition comprising CBN particles, a powdered secondary hard phase and a powdered binder phase, includes the steps of attrition milling the secondary hard phase and binder phase to produce a fine mixture of the components, adding CBN particles to the fine mixture and attrition milling this mixture. Preferably the attrition milling of the powdered secondary phase and the powdered binder phase is a low viscosity attrition milling stage and the milling of the fine mixture and CBN particles is a higher viscosity attrition milling stage.

The powdered mixture, after the attrition milling and drying, is preferably subjected to a vacuum heat treatment to minimise contaminants prior to subjecting the composition to the elevated temperature and pressure conditions necessary for producing a CBN compact.

The volume of CBN present in the composition is preferably from 40 to 75%, more preferably from 45 to 65%. The average particle size of the CBN is usually less than 10 μm and preferably less than 5 μm.

The secondary hard phase preferably consists of a compound containing nitride, carbonitride or carbide of a Group 4, 5 or 6 (according to the new IUPAC format) transition metal. The metal of the nitride, carbonitride or carbide is preferably titanium. The secondary hard phase may be substoichiometric. In this event it may be pre-reacted with the binder phase e.g. aluminium. This will result in a reaction product of stoichiometric secondary hard phase, transition metal aluminides and any unreacted phases.

The binder phase may be any known in the art and preferably consists of aluminium and optionally one or more of other elements, chosen from silicon, iron, nickel, cobalt, titanium, tungsten, niobium and molybdenum, which may be alloyed, compounded or formed in solid solution with the aluminium binder. Typically the binder phase is present in an amount of about 5 to 30 weight % of the secondary hard phase.

The attrition milling will generally take place with the use of cemented tungsten carbide balls. The use of such balls has the effect of introducing some tungsten carbide into the powdered composition. Generally the content of the tungsten carbide will not exceed 3 volume percent of the powdered composition.

The CBN may be unimodal, i.e. all of the CBN particles have the similar average particle size or multimodal, i.e. the CBN mixture has particles with at least two average particle sizes. When the CBN is multimodal, the CBN is preferably bimodal, i.e. the CBN consists of particles with two average particle sizes. For bimodal CBN the range of the average particle size of the finer particles is usually from about 0.1 to about 2 µm and the range of the average particle size of the coarser particles is usually from about 0.3 to about 5 µm. The ratio of the content of the coarser CBN particles to the finer particles is typically from 50:50 to 90:10.

According to another aspect of the invention, a CBN compact is made by subjecting the composition produced by the methods described above to conditions of elevated temperature and pressure suitable to produce such a compact. Such elevated conditions are those at which CBN is crystallographically stable and are known in the art.

The composition may be placed on a surface of a substrate, prior to the application of the elevated temperature and pressure conditions. The substrate will generally be a cemented metal carbide substrate.

DETAILED DESCRIPTION OF PREFERRED EMBODIMENTS

The present invention concerns the manufacturing of the powdered composition or starting material used in producing a CBN compact which comprises CBN, a secondary hard phase and a binder phase. The method includes two steps of attrition milling. First, the attrition milling of the secondary hard phase and the binder phase. Second, adding CBN particles to the fine particle mixture of the first attrition milling and then attrition milling this mixture.

Milling, in general, as a means of comminution and dispersion is well known in the art. Commonly used milling techniques used in grinding ceramic powders include conventional ball mills and tumbling ball mills, planetary ball mills and attrition ball mills and agitated or stirred ball mills. In conventional ball milling the energy input is determined by the size and density of the milling media, the diameter of the milling pot and the speed of rotation. As the method requires that the balls tumble, rotational speeds, and therefore energy are limited. Conventional ball milling is well suited to milling of powders of low to medium particle strength. Typically, conventional ball milling is used where powders are to be milled to final size of around 1 micron or more.

In planetary ball milling, the planetary motion of the milling pots allows accelerations of up to 20 times of gravitational acceleration, which, where dense media are used, allows for substantially more energy in milling compared to conventional ball milling. This technique is well suited to comminution in particles of moderate strength, with final particle sizes of around 1 micron.

Attrition mills consist of an enclosed grinding chamber with an agitator that rotates at high speeds in either a vertical or horizontal configuration. Milling media used are typically in the size range 0.2 to 15 mm and, where comminution is the objective, milling media typically are cemented carbides, with high density. The high rotational speeds of the agitator, coupled with high density, small diameter media, provide for high energy. Furthermore, the high energy in attrition milling results in high shear in the slurry, which provides for very successful co-dispersion, or blending of powders. Attrition milling typically achieves finer particles and better homogeneity of materials in the sintered compact than the other methods mentioned.

This is particularly so when attrition milling is used in a "two step" procedure whereby the powdered secondary phase and the powdered binder phase are milled using attrition milling, preferably in a low viscosity regime, to produce a fine mixture, which typically consists of nanosized particles, generally having an average particle size of between about 200 to about 500 nm particles. The resultant fine mixture and the CBN particles are further subjected to attrition milling, preferably in a higher viscosity regime, as a second step where mixing action is enhanced, resulting in a surprisingly efficient combination of milling and mixing of powders to produce a homogenous and fine mixture.

Another aspect of the invention is that the two-step attrition milling process provides for a controlled amount of wear of the milling media, which is typically cemented carbides. Wear of the milling media will introduce an appreciable amount, typically less than 3 weight % of the cemented carbide into the CBN powder mixture.

Typically, in the low viscosity regime, the solids to liquid volume ratio is low (less than 16%) and the volume ratio of slurry to milling media (e.g. milling balls) is kept less than 60%. These settings create conditions in which the efficiency of the particle size reduction of the secondary hard phase and binder phase particles is increased together with a controlled amount of wear of the milling media.

In the higher viscosity regime, the solids to liquid volume ratio is typically greater than 16%; and the volume ratio of slurry to milling media is typically greater than 60%. These settings create conditions in which the CBN particles are mixed homogeneously with the secondary hard phase and binder phase particles, resulting in a surprisingly efficient combination of milling and mixing of powders with a single type of operation.

The advantages of using the "two step" attrition milling process is that typically a very fine starting material is obtained. The finer secondary hard phase and binder phase grains preferably have high specific surface area and therefore reactivity, leading to very good sintering between the CBN and secondary hard phase particles. Likewise, the small size of the secondary hard phase particles gives them high specific surface area, and hence good binding between secondary hard phase particles as well. This high specific surface area effect imparts high strength to the final structure, without sacrificing the necessary toughness. In addition, the small size of the secondary hard phase particles results in a more homogenous compact which, when the compact is used in the formation of a tool insert, typically results in better performance of the tool insert.

The advantage of a highly homogeneous distribution of CBN and matrix phase, i.e. all phases other than CBN, lies in the distribution of the CBN particles. The distribution of CBN within the matrix is critical because it is the CBN that increases abrasion resistance, high temperature properties and thermal conductivity of the CBN compact. The effect of CBN in the compact is hence maximised if the CBN particles are distributed homogeneously within the matrix. The CBN and matrix phase distribution can be quantified using a method such as that described in U.S. Pat. No. 6,316,094; by measuring the average mean free path or thickness of the matrix phase and the standard deviation of this measurement. A high value of the mean free path and a high value of standard deviation indicates a poor distribution of CBN within the compact matrix.

The mean free path or thickness of the binder phase was measured as follows:

A polished surface of the CBN compact was analysed using a Scanning Electron Microscope. Back-scatter electron images were taken at a suitable magnification depending on the estimated average grain size of the CBN. The collected images were then electronically processed to identify the CBN grains in the image, with the remaining phase being identified as the matrix (non CBN) phase. Straight lines (one pixel thickness) were then superimposed onto the image and the intersection lengths between two CBN grains on these lines were measured. Typically, 90 000 measurements were done on any given sample. The average and the standard deviation values were then calculated from these.

The CBN will preferably contain multimodal particles i.e. at least two types of CBN particles that differ from each other in their average particle size. "Average particle size" means the major amount of the particles will be close to the specified size although there will be a limited number of particles further from the specified size. The peak in distribution of the particles will have a specified size. Thus, for example if the average particle size is 2 µm, there will by definition be some particles which are larger than 2 µm, but the major amount of the particles will be at approximately 2 µm in size and the peak in the distribution of the particles will be near 2 µm.

The use of multimodal, preferably bimodal, CBN in the composition ensures that the matrix is finely divided to reduce the likelihood of flaws of critical size being present in the pre-sintered composition. This is beneficial for both toughness and strength in the compact produced from the composition. Obtaining a matrix material of small particle size, typically less than 0.5 µm, is achieved through mechanical means during pre-processing, specifically by the first, preferably lower viscosity, attrition milling stage of the secondary hard phase, aluminium, any other binder metal and incidental impurities. Typically, any tungsten carbide in the pre-sintered composition/starting material derives from the milling processes described above.

In general, the bulk oxygen content of the powdered composition including CBN, after two step attrition milling is higher than after ball milling, planetary ball milling and other lower energy milling techniques due to substantially increased surface area, which results in formation of thin oxide layer around the particles. Some amount of oxygen may be subsequently reduced by vacuum heat treatment and some reacts to form stable oxides, such as $Al_2O_3$. These oxides normally act as a grain refiner in the matrix, preventing/reducing grain growth of the secondary hard phase grains during high pressure and high temperature sintering.

An additional advantage of attrition milling, where milling media, including balls and pot made of cemented tungsten carbide are used, is that it results in the pick up of extremely fine and well distributed cemented tungsten carbide particles in the powder mixture. During high pressure and high temperature sintering, these particles also act as grain growth inhibitors.

The use of the attrition milling to achieve the required particle sizes in the pre-sintered composition, along with heat treatment for several hours in a vacuum furnace, substantially reduces contaminants in the pre-sintered compact and bulk oxygen content.

Typical conditions of elevated temperature and pressure necessary to produce CBN compacts are well known in the art. These conditions are pressures in the range of about 2 to about 6 GPa and temperatures in the range of about 1100° C. to about 2000° C. Conditions found particularly favourable for the present invention fall within about 4 to about 6 GPa and about 1200 to about 1600° C.

CBN compacts produced using compositions produced by the method of the invention typically contain a secondary hard phase which exhibits a high degree of XRD peak broadening. The XRD peak broadening of the secondary hard phase (at low diffraction angles) indicates that this secondary hard phase has a very fine grain size, ascribed to the attrition milling process and may also contain variations in chemistry. The characteristics of the secondary hard phase were characterised using the Full-Width-Half-Maximum (FWHM) measurements of the major XRD peaks of the secondary hard phase materials.

The very fine CBN particles in the typically bimodal distribution provide the further benefit of inhibiting grain growth of matrix material, apparently by pinning grain boundaries during sintering at the elevated temperature and pressure conditions as described above.

Compacts produced from the compositions of the invention have particular application in continuous, light-interrupted, and medium to heavy interrupted machining of hardened steels such as case-hardened and ball-bearing steels.

The invention will now be described, by way of example only, with reference to the following non-limiting examples. In all of these examples low viscosity attrition milling, as described above, was used for attrition milling the secondary hard phase and binder phase and higher viscosity attrition milling, as described above, was used for milling the CBN-containing mixtures.

EXAMPLES

Example 1

$TiC_{0.8}$ powder was mixed with Al powder, where the weight ratio between $TiC_{0.8}$ and Al powder was 90:10. The powder mixture was heated to 1025° C. under vacuum for 30 minutes and then crushed and powdered. The powder mixture was attrition milled with hexane for four hours. The solid to liquid ratio was kept at 14.3 volume %. CBN powder of 1.2 micron in average particle size was added in a ratio to achieve 50 volume % CBN in the mixture and the mixture was then further attrition milled for one hour. The solid to liquid volume ratio was kept at 20 volume % percent. After attrition milling, the slurry was dried under vacuum and formed into a green compact.

The milled powder contained about 2.01 weight % tungsten carbide from attrition milling, as measured by difference between the weight of milling media before and after attrition milling.

The material was sintered at 55 kbar and at 1300° C. to produce a CBN compact. X-ray analysis of this CBN compact showed a FWHM peak broadening effect for the titanium carbide (111) and (200) planes with an average value of 0.394 degrees 2θ.

Comparative Example 1

Ball Milling Versus Attrition Milling

Material 1A:

$TiC_{0.8}$ powder was mixed with Al powder, where the weight ratio between $TiC_{0.8}$ and Al was 90:10. The powder mixture was heated to 1025° C. under vacuum for 30 minutes and then crushed and powdered. The powder mixture was then, ball milled with hexane for 48 hours. CBN powder having an average particle size of 1.2 micron was added in a ratio to achieve 50 volume % CBN in the mixture; and the mixture was further ball milled for 20 hours. After ball milling, the slurry was dried under vacuum and formed into a green compact.

The material was sintered at 55 kbar and at 1300° C. to produce a CBN compact. X-ray analysis of this CBN compact showed a FWHM peak broadening with an average of 0.360 degrees 2θ from the two peaks of the titanium carbide (111) and (200) planes.

This CBN compact and the compact produced in Example 1 (hereinafter referred to as Material 1B) were analysed and then subjected to a machining test.

According to X-ray diffraction analysis, the sintered materials (Materials 1A and Material 1B) contain besides CBN and TiC (stoichiometric), $TiB_2$, AlN, $Al_2O_3$ and WC.

The average distance between the CBN grains (or mean free path), as measured using the described image analysis method, was 0.75 microns with a standard deviation of 0.85 microns for Material 1B and it was 1.51 microns with a standard deviation of 1.97 microns for Material 1A. This indicates that CBN grains in Material 1B are more uniformly distributed within the matrix (non CBN phases) than Material 1A.

The sintered compacts were both cut using wire EDM and ground to ISO standard insert types of SNMN090308 S0220. SAE 100Cr6 steel of 62HRC was continuously cut using cutting speeds of 150 m/min and 180 m/min with a feed rate of 0.1 mm/rev and depth of cut of 0.2 mm. The round steel bar had a length of 60 mm and a diameter of 41 mm. The cutting test was continued until the cutting edge failed either by edge fracture or chipping. The total cutting distance was measured as an indication of cutting tool performance. None of the tested tools failed as a result of excessive flank wear.

The cutting performances of Material 1A and Material 1B were evaluated using the machining test as described above at a cutting speed of 150 m/min. It was found that Material 1A lasted only on average 1194 m whereas Material 1B was lasted on average 2361 m, which is almost twice the performance of Material 1A.

The machining test was repeated at a cutting speed of 180 m/min and the performance of the cutting tool materials were evaluated using the described method above. Material 1A performed only on average of 820 m as cutting distance whereas Material 1B performed 1944 m on average.

Example 2

$Ti(C_{0.5}N_{0.5})_{0.6}$ powder was mixed with Al powder, where the weight ratio between $Ti(C_{0.5}N_{0.5})_{0.8}$ and Al powder was 90:10. The powder mixture was heated to 1025° C. under vacuum for 30 minutes and then crushed and powdered. The powder mixture was attrition milled with hexane for 4 hours. The solid to liquid ratio was kept at 15.3 volume %. CBN powder of 0.7 micron in average particle size was added in a ratio to achieve 50 volume % CBN in the mixture and the mixture was further attrition milled for one hour. The solid to liquid volume ratio was kept at 18.3 volume %. After attrition milling, the slurry was dried under vacuum and formed into a green compact.

The milled powder contained about 1.1% by weight of tungsten carbide from attrition milling, as measured by difference between the weight of milling media before and after attrition milling.

The material was sintered at 55 kbar and at 1300° C. to produce a CBN compact. X-ray analysis of this CBN compact showed a FWHM peak broadening effect for the titanium carbonitride (111) and (200) planes with an average value of 0.574 degrees 2θ.

Comparative Example 2

Ball Milling Versus Attrition Milling

Material 2A:

$Ti(C_{0.5}N_{0.5})_{0.8}$ powder was mixed with Al powder, where the weight ratio between $Ti(C_{0.5}N_{0.5})_{0.8}$ and Al was 90:10. The powder mixture was heated to 1025° C. under vacuum for 30 minutes and then crushed and powdered. The powder mixture was then ball milled with hexane for 48 hours. CBN powder of 0.7 micron in average particle size was added in a ratio to achieve 50 volume % CBN in the mixture and the mixture was further ball milled 20 hours. After ball milling, the slurry was dried under vacuum and formed into a green compact.

The material was sintered at 55 kbar (5.5 GPa) and at 1300° C. to produce a CBN compact. X-ray analysis of this CBN compact showed a FWHM peak broadening effect for the titanium carbonitride (111) and (200) planes with an average value of 0.436 degrees 2θ.

This CBN compact and the CBN compact of Example 2 (hereinafter referred to as Material 2B) were analysed and then subjected to a machining test.

According to X-ray diffraction analysis, the sintered materials (Materials 2A and Material 2B) contain besides CBN and $Ti(C_{0.5}N_{0.5})$, $TiB_2$, AlN, $Al_2O_3$ and WC.

The average distance between CBN grains (MFP), as measured using the described image analysis method, was 0.4 microns with a standard deviation of 0.43 microns for Material 1B and it was 0.49 microns with a standard deviation of 0.6 microns for Material 1A. This indicates that the CBN grains in Material 1B are more uniformly distributed within the matrix (non CBN phases) than in Material 1A.

These materials were tested in continuous finish hard turning of 100Cr6 ball bearing steel of 61 HRC. The tests were undertaken with the following cutting conditions:

| | |
|---|---|
| Cutting speed, vc (m/min): | 200 |
| Depth of cut (mm): | 0.15 |
| Feed, f (mm): | 0.10 |
| Insert geometry: | SNMN 090308 TO 1020 (edge radius, r0 = 10-15 j-im) |

The round steel bar had a length of 20 mm and a diameter of 40.6 mm. The 'immersion' time of the tool was 7.2 seconds per pass. The cutting tools were examined after every six passes. All cutting tools were noted to fail as a result of edge-chipping/fracture, rather than excessive flank wear. On average, Material 2B performed 937 m as total cutting distance before failure; whereas Material 2A failed at only 374 m.

Example 3

A sub-stoichiometric titanium carbonitride powder (Ti$(C_{0.3}N_{0.7})_{0.8}$ of average particle size of 1.4 micron was mixed with Al powder, average particle size of 5 micron. The mass ratio between Ti$(C_{0.3}N_{0.7})_{0.8}$ and Al was 90:10. The powder mixture was pressed into a titanium cup to form a green compact and heated to 1025° C. under vacuum for 30 minutes and then crushed and pulverized. The powder mixture was then attrition milled for 4 hours. The solid to liquid ratio was kept at 15.1 volume % for the first stage of milling. A CBN powder mixture, containing about 30 weight % CBN with average particle size of 0.7 micron and remaining CBN with average particle size of 2 micron, was added into the slurry at a certain amount to obtain overall 60 volume % CBN. The CBN containing slurry was milled and mixed for an hour using attrition milling. The solid to liquid ratio was kept at 18.3 volume % for the second stage of milling. The slurry was dried under vacuum and formed into a green compact and was sintered at 55 kbar (5.5 GPa) and about 1300° C. to produce a CBN compact.

The milled powder, prior to sintering, contained about 1.3% by weight of tungsten carbide from attrition milling, as measured by difference between the weight of milling media before and after attrition milling.

X-ray analysis of this CBN compact showed a FWHM peak broadening effect for the titanium carbonitride (111) and (200) planes with an average value of 0.631 degrees 2θ.

The average distance between the CBN grains (MFP) in the sintered CBN material, as measured using the described image analysis method, was 0.55 microns with a standard deviation of 0.57 microns.

Example 4

A sub-stoichiometric titanium carbonitride powder (Ti$(C_{0.5}N_{0.5})_{0.8}$ of average particle size of 1.4 micron was mixed with Al powder, average particle size of 5 micron. The mass ratio between Ti$(C_{0.5}N_{0.5})_{0.8}$ and Al was 90:10. The powder mixture was pressed into a titanium cup to form a green compact and heated to 1025° C. under vacuum for 30 minutes and then crushed and pulverized. The powder mixture was then attrition milled for 4 hours. The solid to liquid ratio was kept at 12.8 volume % for the first stage of the milling.

A CBN powder mixture, containing about 30 weight % CBN with average particle size of 0.7 micron and remaining CBN with average particle size of 1.4 micron, was added into the slurry to obtain overall 55 volume % CBN. The CBN containing slurry was milled and mixed for an hour using attrition milling. The solid to liquid ratio was kept at 17.4 volume % for the first stage of the milling. The slurry was dried under vacuum and formed into a green compact and then sintered at 55 kbar (5.5 GPa) and about 1300° C. to produce a CBN compact.

The milled powder, before sintering, contained about 1.7% by weight of tungsten carbide from attrition milling, as measured by difference between the weight of milling media before and after attrition milling.

X-ray analysis of this CBN compact showed a FWHM peak broadening effect for the titanium carbonitride (111) and (200) planes with an average value of 0.596 degrees 2θ.

The average distance between the CBN grains (mean free path) in the sintered CBN material, as measured using the described image analysis method, was 0.52 microns with a standard deviation of 0.52 microns.

The invention claimed is:

1. A method of making a powdered composition for the manufacture of a cubic boron nitride (CBN) compact, the composition comprising CBN particles, a powdered secondary hard phase and a powdered binder phase; the method comprises:
    (i) attrition milling the secondary hard phase and the powdered binder phase to produce a fine mixture of the components,
    (ii) adding CBN particles to the fine mixture of (i), and
    (iii) attrition milling the mixture (ii), thereby producing the powdered composition.

2. The method according to claim 1, wherein the attrition milling of the secondary hard phase and the powdered binder phase is such that a solids to liquid volume ratio is less than 16% and a volume ratio of slurry to a milling media is less than 60%.

3. The method according to claim 1 or claim 2, wherein the attrition milling of the fine mixture and the CBN particles in (ii) is such that a solids to liquid volume ratio is greater than 16% and a volume ratio of slurry to a milling media is greater than 60%.

4. The method according to claim 1, wherein the volume of the CBN particles in the powdered composition is from 40 to 75%.

5. The method according to claim 1, wherein the volume of the CBN particles in the powdered composition is from 45 to 65%.

6. The method according to claim 1, wherein the average particle size of the CBN particles in the powdered composition is less than 10 μm.

7. The method according to claim 6, wherein the average particle size of the CBN particles in the powdered composition is less than 5 μm.

8. The method according to claim 1, wherein the powdered composition comprises about 40 to about 75 volume % of the CBN particles; the secondary hard phase comprising a compound containing nitride, carbonitride or carbide of a Group 4, 5 or 6 transition metal and the powdered binder phase.

9. The method according to claim 1, wherein the CBN particles in the powdered composition comprise particles of at least two average particle sizes.

10. The method according to claim 9, wherein the CBN particles consists of particles with two average particle sizes.

11. The method according to claim 9, wherein a range of the average particle size of finer particles is from about 0.1 to about 2 μm and a range of the average particle size of coarser particles is from about 0.3 to about 5 μm.

12. The method according to claim 9, wherein a ratio of a content of coarser CBN particles to finer particles is from 50:50 to 90:10.

13. The method according to claim 8, wherein the transition metal is titanium.

14. The method according to claim 8, wherein the powdered binder phase is present in an amount of about 5 to 30 weight % of the secondary hard phase.

15. A CBN compact produced by subjecting a composition produced by the method of claim 1 to conditions of elevated temperature and pressure suitable to produce the CBN compact.

16. A tool insert comprising a CBN compact according to claim 15.

* * * * *